(12) United States Patent
Jung et al.

(10) Patent No.: US 8,312,041 B2
(45) Date of Patent: Nov. 13, 2012

(54) RESOURCE DESCRIPTION FRAMEWORK NETWORK CONSTRUCTION DEVICE AND METHOD USING AN ONTOLOGY SCHEMA HAVING CLASS DICTIONARY AND MINING RULE

(75) Inventors: Han Min Jung, Daejeon (KR); Pyung Kim, Daejeon (KR); Seung Woo Lee, Daejeon (KR); Mi Kyung Lee, Daejeon (KR); Dong Min Seo, Cheongju-si (KR); Won Kyung Sung, Daejeon (KR)

(73) Assignee: Korea Institute of Science and Technology Information, Daejeon (KR)

( * ) Notice: Subject to any disclaimer, the term of this patent is extended or adjusted under 35 U.S.C. 154(b) by 0 days.

(21) Appl. No.: 12/897,963

(22) Filed: Oct. 5, 2010

(65) Prior Publication Data

US 2011/0270882 A1    Nov. 3, 2011

(30) Foreign Application Priority Data

Apr. 28, 2010  (KR) .......................... 10-2010-0039407

(51) Int. Cl.
G06F 17/30  (2006.01)
(52) U.S. Cl. ...................................... 707/776; 707/802
(58) Field of Classification Search .................. 707/776, 707/802
See application file for complete search history.

(56) References Cited

U.S. PATENT DOCUMENTS

| | | | |
|---|---|---|---|
| 2006/0074980 A1* | 4/2006 | Sarkar | 707/104.1 |
| 2006/0112125 A1* | 5/2006 | Potok et al. | 707/101 |
| 2006/0235837 A1* | 10/2006 | Chong et al. | 707/4 |
| 2008/0033993 A1* | 2/2008 | Uceda-Sosa | 707/104.1 |
| 2009/0254540 A1* | 10/2009 | Musgrove et al. | 707/5 |
| 2010/0036788 A1* | 2/2010 | Wu et al. | 706/47 |
| 2010/0268702 A1* | 10/2010 | Wissner et al. | 707/711 |

FOREIGN PATENT DOCUMENTS

| | | | | |
|---|---|---|---|---|
| KR | 10-2005-0114947 A | | 12/2005 | |
| KR | 10-2007-0045754 | * | 11/2008 | 707/101 |
| KR | 10-2008-0099895 A | | 11/2008 | |

OTHER PUBLICATIONS

European Search Report for European Patent Application No. 10186160.7 which corresponds to U.S. Appl. No. 12/897,963.
Witold Abramowicz et al., "Supporting Topic Map Creation Using Data Mining Techniques", Australasian Journal of Information Systems, vol. 11, No. 1, 2003, pp. 63-78, XP-002649231, Special Issue 2003/2004, The Poznan University of Economics, Poznan, Poland.
Susie Stephens et al., "Enabling Semantic Web Inferencing with Oracle Technology: Applications in Life Sciences", Jan. 1, 2005, Rules and Rule Markup Languages for the Semantic Web Lecture Notes in Computer Science; LNCS, pp. 8-16, 2005, Springer, Berlin, DE.
Nicole Alexander et al., "RDF Object Type and Reification in the Database", Data Engineering, 2006. ICDE '06. Proceedings of the 22nd International Conference on Atlanta, GA, USA Apr. 3-7, 2006, Piscataway, NJ, USA, IEEE pp. 93-93.
Thanh Tran et al., "On the Role and Application of Ontologies in Information Systems", Research, Innovation and Vision for the Future, 2007 IEEE International Conference on, IEEE, PI, Mar. 1, 2007, pp. 14-21.

* cited by examiner

*Primary Examiner* — Son T Hoang
(74) *Attorney, Agent, or Firm* — LRK Patent Law Firm

(57) ABSTRACT

RDF network construction device and method using an ontology schema having class dictionaries and mining rules. The RDF network construction device includes an ontology schema storing module, a class managing module, a mining rule managing module, a mining pattern creating module, and an RDF triple creating module.

19 Claims, 7 Drawing Sheets

RESOURCE DESCRIPTION FRAMEWORK NETWORK CONSTRUCTION DEVICE AND METHOD USING AN ONTOLOGY SCHEMA HAVING CLASS DICTIONARY AND MINING RULE

CROSS-REFERENCE TO RELATED APPLICATION

This application claims the benefit under 35 U.S.C. §119 (a) of Korean Patent Application No. 10-2010-0039407, filed on Apr. 28, 2010, the entire disclosure of which is incorporated herein by reference for all purposes.

BACKGROUND

1. Field

The present invention relates to resource description framework network construction device and method using an ontology schema having class dictionaries and mining rules that creates RDF (Resource Description Framework) triple based on an identification system from a text document converted into a mining pattern by using an ontology schema having a named entity dictionary and a mining rule, and constructs a network by connecting different RDF triples.

2. Description of the Related Art

In the information technology, ontology implies a work model of a substantial entity in a specific intellectual domain and interaction, such as an electronic commerce. That is, the ontology is a representation of conceptualized and specified knowledge in a specific domain and can be defined as a network or a graph having relationships of the concepts used in the domain.

The ontology is constructed by defining concepts and properties from knowledge about the components of the ontology which are constructed in the ontology, from documents associated with a specific field, that is, concepts, properties of the concepts, and relationships of the concepts, and setting the relationships between concepts and concepts.

The ontology is studied and developed in connection with process of natural languages at the present time and researches are conducted mainly for construction of ontology for processing natural language from various language sources of the related art.

SUMMARY

The present invention relates to resource description framework network construction device and method using an ontology schema that converts a input text document into a mining pattern by using an ontology schema having class dictionaries and mining rules, creates corresponding RDF triples from mining patterns in accordance with the mining rules, and the construct an RDF network by connecting different RDF triples, and a record medium recorded with them and readable by electronic devices.

An aspect of the present invention provides an RDF (Resource Description Framework) network construction device that includes: an ontology schema storing module that stores an ontology schema defining a relationship system between concepts: a class managing module that connects and stores, in a set, authority data composed of classes, terms classified by the classes, identifiers of the terms, representative terms, and identifier of the representative terms; a mining rule managing module that connects and stores, in a set, a property of the ontology schema, one mining pattern corresponding to the properties, and one or more RDF triples corresponding to the mining patterns; a mining pattern creating module that is linked with the class managing module, recognizes terms from an input text document and represents the terms into corresponding classes and properties representing relationships between classes, and converts the text document, which represents the classes into properties, into a mining pattern; and an RDF triple creating module that is linked with the mining rule managing module and creates an RDF triple by comparing the mining pattern stored in the mining rule managing module with the mining pattern of the text document.

The RDF network construction device using an ontology schema may further include an RDF network creating module that constructs an RDF network by searching classes having the same identifiers from different RDF triples and connecting the same classes.

The mining pattern creating module may include: a class recognizing unit that recognizes terms by using morphological analysis, syntax analysis, and semantic analysis on an input text document, in link with the class managing module, and represents the recognized terms into classes corresponding to the terms stored in the class managing module; and a mining pattern converting unit that converts the text document including the classes into a mining pattern.

The RDF triple creating module may include: a mining pattern comparing unit that compares the mining pattern stored in the mining rule managing module with the mining pattern of the text document, in link with the mining rule managing module; a first RDF triple creating unit that determines an class-based RDF triple composed of a class and a property that correspond to the corresponding mining pattern of the mining pattern managing module, on the basis of the result of comparing the mining patterns; a second RDF triple creating unit that creates a term-based RDF triple composed of properties and terms, by converting classes of the class-based RDF triple into corresponding terms, in link with the class managing module; and a third RDF triple creating unit that converts the terms of the term-based RDF triple into corresponding identifiers, in link with the class managing module 120, and creates an identifier-base RDF triple composed of identifiers and properties.

The RDF triple creating module may further include a fourth RDF triple creating unit that creates an RDF triple by converting the identifier of an identifier-based RDF triple created by the third RDF triple creating unit into the identifier of the representative term of authority data, when a term having different terms and the same identifier is searched from the class managing module.

The RDF triple creating module may include: a mining pattern comparing unit that compares mining patterns stored in the mining rule managing module with mining patterns of the text document, in link with the mining rule managing module; a class-based RDF triple creating unit that determines an RDF triple composed of classes and properties corresponding to the corresponding mining pattern of the mining rule managing module on the basis of the result comparing mining patterns; a term-based RDF triple creating unit that creates a term-based RDF triple composed of terms and properties by converting the classes of an RDF triple composed of classes and properties into corresponding terms, in link with the class managing module; and an identifier-base RDF triple creating unit that searches the class managing module and creates an RDF triple by converting the terms of the term-based RDF triple into identifiers of the representative terms of the authority data, when there is a term having different terms and the same identifier.

The class of the class managing module may be set by a key value.

The property of the mining rule managing module may be set by a key value.

The mining pattern may be configured in any one of formats of vocabulary, RE(regular expression), and LSP (Lexico-Semantic Pattern).

The RDF triple may include a single RDF triple composed of two classes and one property and a multi-RDF triple composed of two or more classes and two or more properties.

The multi-RDF triple may be implemented by connecting two or more of the single RDF triple.

The RDF triple creating module may be linked with the mining rule managing module and creates an RDF triple by comparing mining patterns corresponding all of the properties stored in the mining rule managing module with the mining pattern of the text document.

The RDF triple creating module may be linked with the mining rule managing module and connected with an user interface selecting any one of the properties stored in the mining rule managing module, or predetermined properties, and may create an RDF triple by comparing the mining pattern corresponding to the selected property with the mining pattern of the text document.

Another aspect of the present invention provides an RDF (Resource Description Framework) network construction method using an ontology schema, which includes an ontology schema storing module that stores an ontology schema defining a relationship system between concepts, a class managing module that connects and stores, in a set, authority data composed of classes corresponding to concepts of the ontology schema, terms classified by the classes, identifiers of the terms, representative terms, and identifier of the representative terms, and a mining rule managing module that connects and stores, in a set, properties of the ontology schema, one or more mining patterns corresponding to the properties, and one or more RDF triples corresponding to the mining patterns, the ontology schema storing module, and the class managing module, and the mining rule managing module are linked with each other. The method includes: recognizing terms from an input text document and representing the terms into classes stored in the class managing module and properties representing relationships of the classes; converting the text document represented by the classes and the properties into mining patterns; searching the same mining patterns by comparing the mining patterns stored in the mining rule managing module and the mining patterns of the text document, in link with the mining rule managing module; and determining an RDF triple corresponding to the searched mining patterns.

The RDF network construction method using an ontology schema may further include constructing an RDF network by searching classes having the same identifiers from different RDF triple and connected the same classes, after the determining of an RDF triple corresponding to the searched mining patterns.

The recognizing terms from an input text document and representing the terms into classes stored in the class managing module and properties representing relationships of the classes, may include: recognizing terms from the input text document; searching classes corresponding to the recognized terms by using the class managing module; searching properties of the ontology schema by using concepts corresponding to the classes of the class managing module; and representing relationships of the classes by using the searched properties.

The determining of an RDF triple corresponding to the searched mining patterns may include: determining a class-based RDF triple composed of classes and properties corresponding to the same mining patterns of the mining pattern managing module, on the basis of the result of comparing mining patterns; creating a term-based RDF triple composed of terms and properties by converting the classes of the class-based RDF triple into the corresponding terms, in link with the class managing module; and creating an identifier-based RDF tripe composed of identifiers and properties by converting the terms of the term-based RDF triple into identifiers of the terms, in link with the class managing module.

In the RDF network construction method using an ontology schema, the creating of an identifier-based RDF tripe composed of identifiers and properties by converting the terms of the term-based RDF triple into identifiers of the terms, in link with the class managing module, may further include creating an RDF triple by converting the identifiers of the identifier-base RDF triple into identifiers of representative terms of the authority data, when there is a term having different terms and the same identifier as a result of searching the class managing module.

The determining of an RDF triple corresponding to the searched mining patterns may include: determining a class-based RDF triple composed of classes and properties corresponding to the same mining patterns of the mining pattern managing module, on the basis of the result of comparing mining patterns; creating a term-based RDF triple composed of terms and properties by converting the classes of the class-based RDF triple into the corresponding terms, in link with the class managing module; and creating an identifier-based RDF triple composed of identifiers and properties by converting the terms of the term-based RDF triple into representative terms of the authority data in link with the class managing module, when there is a term having different terms and the same identifier as a result of searching the class managing module.

The RDF triple may include a single RDF triple composed of two classes and one property and a multi-RDF triple composed of two or more classes and two or more properties.

The multi-RDF triple may be implemented by connecting two or more of the single RDF triple.

The searching of the same mining patterns by comparing the mining patterns stored in the mining rule managing module and the mining patterns of the text document, in link with the mining rule managing module, may include: selecting any one of the properties stored in the mining rule managing module; and searching mining patterns of the text document which agree with the mining patterns corresponding to the selected properties.

The searching of the same mining patterns by comparing the mining patterns stored in the mining rule managing module and the mining patterns of the text document, in link with the mining rule managing module, may include: sequentially searching mining patterns relating to all of the properties stored in the mining rule managing module; and searching the same mining patterns by comparing the sequentially searched mining patterns with the mining patterns of the text document.

Another aspect of the present invention provides a record medium that is recorded with a program performing the RDF (Resource Description Framework) network construction method using an ontology schema and is readable by electronic devices.

DETAILED DESCRIPTION

Figure 1:
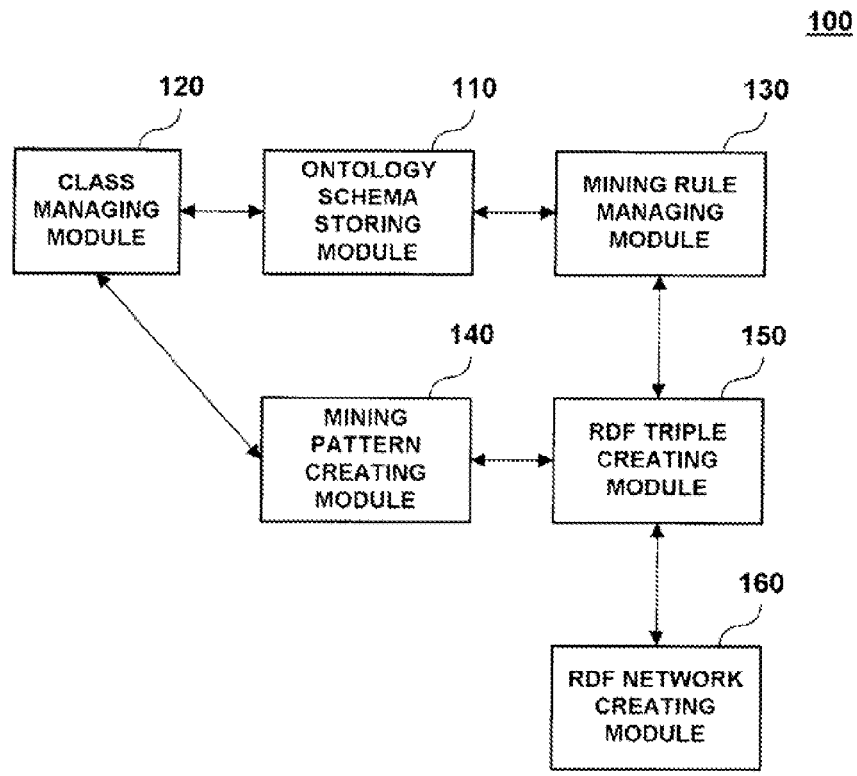
FIG. 1 is a diagram illustrating the configuration of an embodiment of a resource description frame network construction device using an ontology schema according to an aspect of the present invention.

The present invention may be modified in various ways and implemented by various embodiments, but specific embodiments are exemplified in the accompanying drawings and explained in detail in the detailed description. However, this is not limited to specific embodiments of the present invention and all of modification, equivalents, and substitutions should be construed as being included in the spirit and scope of the present invention.

Hereinafter, resource description framework (hereafter referred to as 'RDF') network construction device and method using an ontology schema having class dictionaries and mining rules according to an embodiment of the present invention, and a record medium recorded with them and readable by electronic devices are described in detail with reference to the accompanying drawings, and the same or corresponding components are given the same reference numerals throughout the drawings, and the repeated descriptions are not provided.

<Resource Description Framework network Construction Device using Ontology Schema>

Figure 11:
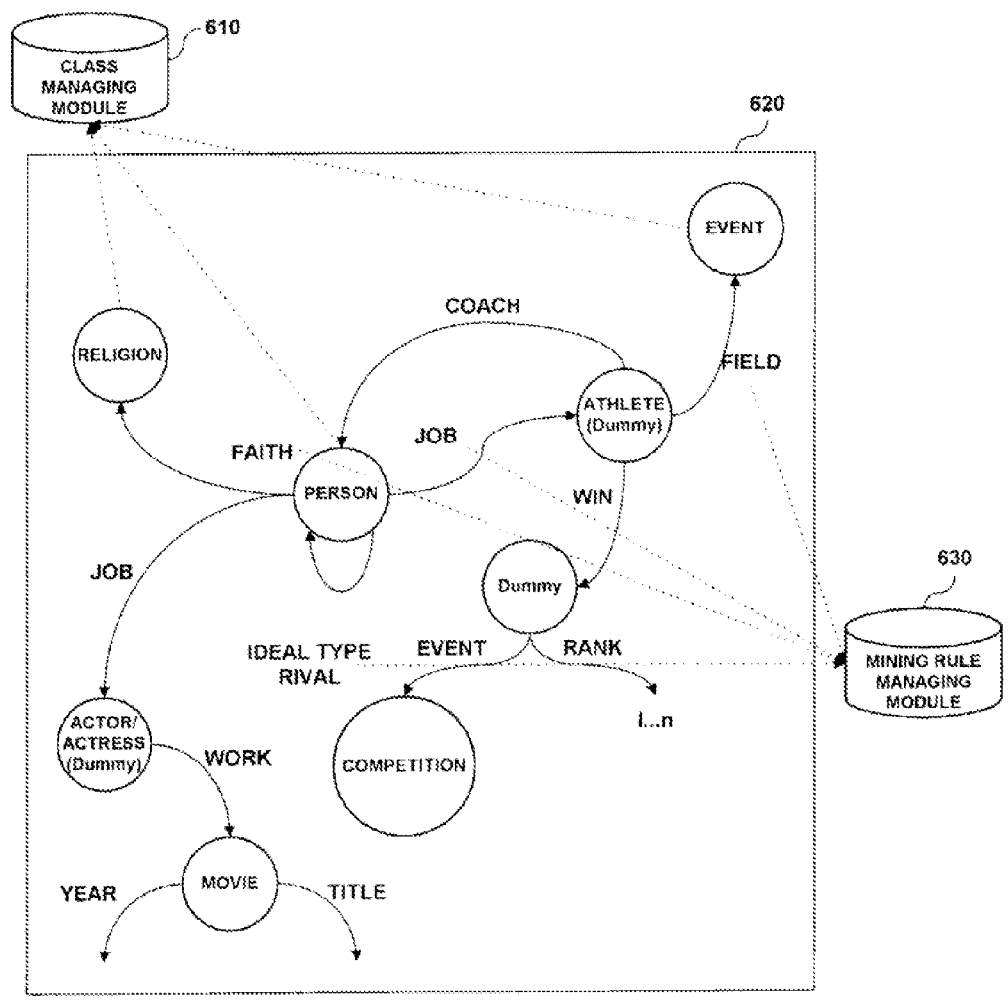
FIG. 11 is a conceptual diagram illustrating the connection relationships of the class managing module, the mining rule managing module, and an ontology schema of the present invention.

FIG. 1 is a diagram illustrating the configuration of an embodiment of an RDF network construction device 100 using an ontology schema according to an aspect of the present invention and FIG. 11 is a conceptual diagram illustrating connection relationships of a class managing module, a mining rule managing module, and an ontology schema of the present invention.

According to an embodiment of the present invention, as shown in FIG. 1, the RDF network construction device 100 using an ontology schema includes an ontology schema storing module 110, a class managing module 120, a mining rule managing module 130, a mining pattern creating module 140, an RDF triple creating module 150, and RDF network creating module 160.

The ontology schema storing module 110 can stores an ontology schema defining a relationship system between concepts and can store a plurality of ontology schemas where relationship systems between predetermined concepts for each specific field are defined.

The ontology schema may be modeled and updated in advance and stored in the ontology schema storing module 110, and may be configured with different data models for each field.

Ontology is a specification connecting relationships of classes, using properties and the ontology schema is a concept system constructed by ontology experts in consideration of services in specific field or applied domains, such that the ontology schemas are continuously connected in explicit relationships between classes.

For example, as shown in FIG. 11, the ontology schema stored in an ontology schema storing module 620 may be composed of concepts, such as person, religion, and athlete, and properties representing relationships between the concepts, such as faith and job.

The ontology schema storing module 620 stores the concepts of ontology schemas corresponding to terms as properties of the class managing module 610, in link with the class managing module 610.

The class managing module 120 can connect and store, in a set, authority data composed of classes, terms classified by the classes, identifiers of the terms, representative terms, and identifier of the representative terms, and the classes may be set by key values.

For example, the class managing module 120 can connect and store in one format the classes, terms, identifiers, and authority data listed in each row, as shown in Table 1, and when "Brian Orser" who is a coach of 'KIM Yu-Na" is expressed by different name, "Brian Orser" or "Orser", the authority data can be composed of "Brian Orser" and the identifier of the representative term "http://ontoframe.kr/Person/0004".

The classes, "person", "object", "religion", described in Table 1, correspond to the concepts of the ontology schema and may be set by key values of the class managing module 120.

TABLE 1

| Class | Term | Identifier | Authority Data |
|---|---|---|---|
| Person | KIM Yn-Na | http://ontoframe.kr/Person/0001 | KIM Yn-Na(http://ontoframe.kr/Person/0001) |
| person | YU Jae-Seok | http://ontoframe.kr/Person/0002 | YU Jae-Seok(http://ontoframe.kr/Person/0002) |
| Person | YU Jae-Seok | http://ontoframe.kr/Person/0003 | YU Jae-Seok(http://ontoframe.kr/Person/0003) |
| Person | Brian Orser | http://ontoframe.kr/Person/0004 | Brian Orser(http://ontoframe.kr/Person/0004) |
| Person | Orser | http://ontoframe.kr/Person/0005 | Brian Orser(http://ontoframe.kr/Person/0005) |
| Object | Orser (五琳) | http://ontoframe.kr/Product/0001 | Orser(http://ontoframe.kr/Produt/0001) |
| Religion | Roman Catholicism | http://ontoframe.kr/Religion/0001 | Roman Catholicism(http://ontoframe.kr/Religion/0001) |
| Item | Figure skating | http://ontoframe.kr/SportsEvent/0001 | Figure skating(http://ontoframe.kr/SportsEvent/0001) |

The mining rule managing modules 130, 630, as shown in FIG. 11, is link with the ontology schema storing module 620 and can connect and store, in a set, properties of the ontology schema, one or more mining patterns corresponding to the properties, and one or more RDF triples corresponding to the mining patterns, and the properties can be set by key values.

Therefore, it is possible to search properties and determine mining patterns connected with corresponding properties, and RDF triples.

For example, as shown in FIG. 11, the ontology schema stored in an ontology schema storing module 620 may be composed of concepts, such as person, religion, and athlete, and properties representing relationships between the concepts, such as faith and job, and can stores corresponding mining patterns together with RDF triples by setting the religion and job into key values.

The mining pattern creating module 140 is linked with the class managing module 120, can recognize terms from an input text document and represent the terms into corresponding classes and properties representing relationships between classes, and convert the text document, which represents the classes into properties, into a mining pattern.

The RDF triple creating module 150 is linked with the mining rule managing module 130 and can create an RDF triple by comparing the mining pattern stored in the mining rule managing module 130 with the mining pattern of the text document.

The RDF network creating module 160 can construct an RDF network by searching classes having the same identifiers from different RDF triples and connecting the same classes.

Hereinafter, the configuration and function o the mining pattern creating module 140 and the RDF triple creating module 150 are described in detail.

Figure 2:
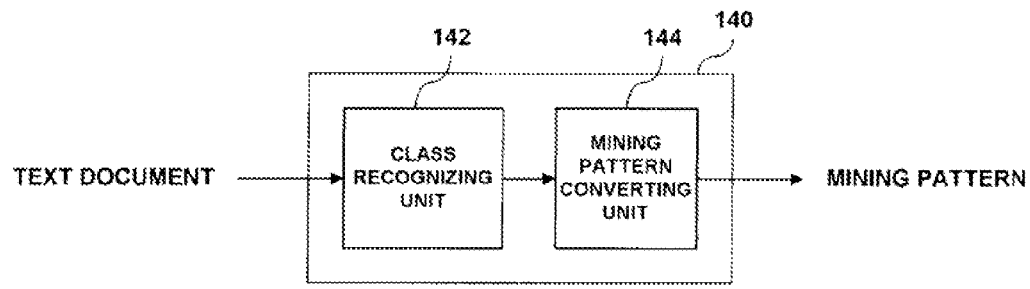
FIG. 2 is a diagram illustrating the configuration of an embodiment of a mining pattern creating module of the resource description frame network construction device using an ontology schema according to an aspect of the present invention.
Figure 3:
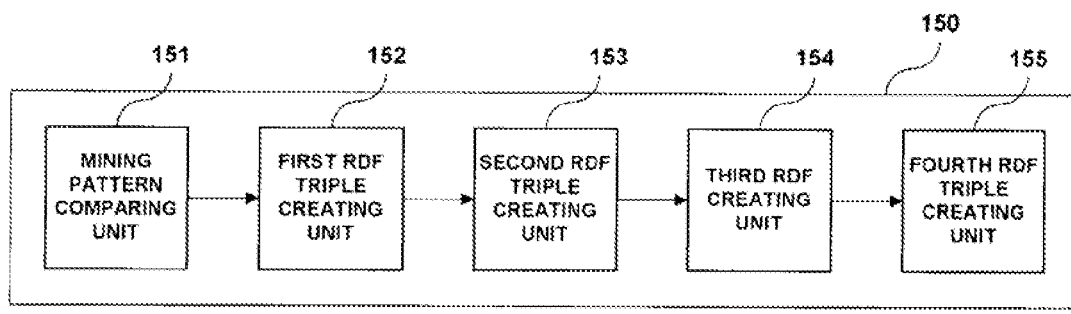
FIG. 3 is a diagram illustrating the configuration of an embodiment of an RDF triple creating module of the resource description frame network construction device using an ontology schema according to an aspect of the present invention.
Figure 4:
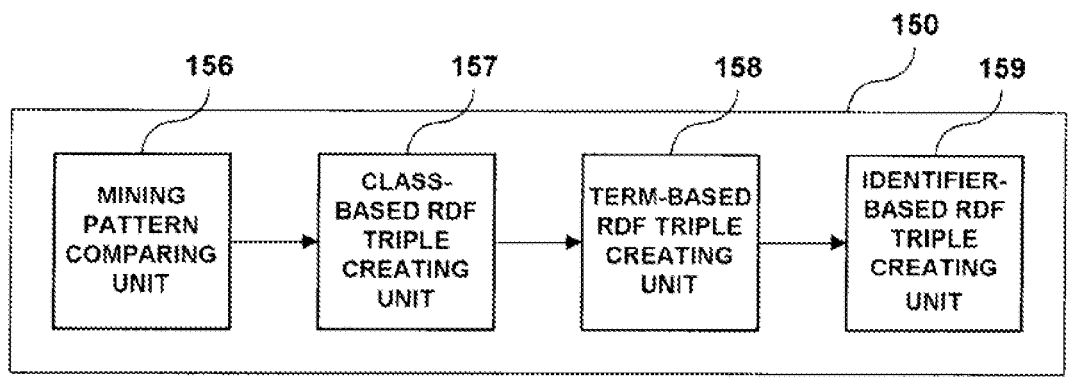
FIG. 4 is a diagram illustrating the configuration of another embodiment of the RDF triple creating module of the resource description frame network construction device using an ontology schema according to an aspect of the present invention.

FIG. 2 is a diagram illustrating the configuration of an embodiment of a mining pattern creating module of the resource description frame network construction device using an ontology schema according to an aspect of the present invention, FIG. 3 is a diagram illustrating the configuration of an embodiment of an RDF triple creating module of the resource description frame network construction device using an ontology schema according to an aspect of the present invention, and FIG. 4 is a diagram illustrating the configuration of another embodiment of the RDF triple creating module of the resource description frame network construction device using an ontology schema according to an aspect of the present invention.

Mining Pattern Creating Module

First, as shown in FIG. 2, the mining pattern creating module 140 may include a class recognizing unit 142 and a mining pattern converting unit 144.

The class recognizing unit 142 recognizes terms by using morphological analysis, syntax analysis, and semantic analysis on an input text document, in link with the class managing module 120, and can represent the recognized terms into classes corresponding to the terms stored in the class managing module 120.

For example, it is possible to recognize terms, "KIM Yn-Na", "YU Jae-Seok", "ideal type" from a sentence "KIM Yu-Na said that YU Jae-Seok is my ideal type" by morphological analysis, syntax analysis, and semantic analysis, and represent the recognized terms into classes corresponding to the terms stored in the class managing module 120 ("KIM Yn-Na"→person, "Yu Jae-Seok"→person).

The mining pattern converting unit 144 can convert a text document including classes into a mining pattern. The mining pattern may be configured in any one of formats of vocabulary, RE(regular expression), or LSP (Lexico-Semantic Pattern).

That is, when being converted into a mining patter, the example sentence may be represented by "[person 1]jcs %ideal_type of [person 2]jco%self".

RDF Triple Creating Module According to First Embodiment

As shown in FIG. 3, the RDF triple creating module 150 according to the first embodiment may include a mining pattern comparing unit 151, a first RDF triple creating unit 152, a second RDF triple creating unit 153, a third RDF creating unit 154 and a fourth RDF triple creating unit 155.

The mining pattern comparing unit 151 compares the mining pattern stored in the mining rule managing module 130 with the mining pattern of a text document, in link with the mining rule managing module 130.

The first RDF triple creating unit 152 can determine an class-based RDF triple composed of a class and a property that correspond to the corresponding mining pattern of the mining pattern managing module 130, on the basis of the result of comparing mining patterns.

For example, when "ideal type" is selected as a key value of the mining pattern managing module 130, it is possible to determine a mining pattern corresponding to the selected property and a class-based RDF triple.

That is, it is possible to determine the mining pattern [person 1]jcs %ideal_type of [person 2]jco%self" connected with "ideal type", which is the property of the mining pattern managing module 130, and a class-based RDF triple "[person 1]-ideal type-[person 2]".

The second RDF triple creating unit 153 can create a term-based RDF triple composed of properties and terms, by converting classes of the class-based RDF triple into the terms, in link with the class managing module 120.

For example, the second RDF triple creating unit 153 can convert the classes of the class-based RDF triple "[person 1]-ideal type-[person 2]" into corresponding terms, in link with the class managing module 120, and represent them into a term-based RDF triple "[KIM Yn-Na]-ideal type-[Yu Jae-Seok]".

The third RDF triple creating unit 154 can convert the terms of the term-based RDF triple into corresponding identifiers, in link with the class managing module 120, and create an identifier-base RDF triple composed of identifiers and properties.

For example, the third RDF triple creating unit 154 can create an identifier-based RDF triple "[hettp//ontoframe.kr/Person/001]-ideal type-[http://ontoframe.kr/Person/0002] by converting the terms "KIM Yn-Na" and "Yu Jae-Seok" of the term-based RDF tripe "[KIM Yn-Na]-ideal type-[Yu Jae-Seok]" into identifiers "[http//ontoframe.kr/Person/001]" and "-[http://ontoframe.kr/Person/0002]".

Further, the RDF triple creating module 150 may further include the fourth RDF triple creating unit 155. When a term having different terms and the same identifier is searched from the class managing module 120, the RDF triple creating module 150 can create an RDF triple by converting the identifier of an identifier-based RDF triple created by the third RDF triple creating unit 154 into the identifier of the representative term of authority data.

Therefore, when a plurality of terms representing the same object is stored in the class managing module 120, it is possible to increase efficiency in management of language sources by converting the identifier of the identifier-based RDF triple into the identifier of the representative term.

The RDF triple may include a single RDF triple composed of two classes and one property and a multi-RDF triple composed of two or more classes and two or more properties. The multi-RDF triple may be implemented by connecting two or more of the single RDF triple.

The single RDF triple is a type of RDF triple that corresponds to one mining pattern and is composed of two classes and one property. and the "[hettp://ontoframe.kr/Person/001]-ideal type-[http://ontoframe.kr/Person/0002]" is an example of the single RDF triple.

The multi-RDF triple is a type of RDF triple that corresponds to one mining pattern and is composed of two or more classes and two or more properties and can be implemented by connecting two single RDF triples.

For example, a multi-RDF triple, "[http://ontoframe.kr/Person/0001]-job-[http://ontoframe.kr/Dummy/0001]-field-[http://ontoframe/kr/SportsEvent/0001] is implemented by connecting two single RDF triple.

That is, the multi-RDF triple can be implemented by connecting single RDF triples "[http://ontoframe.kr/Person/0001]-job-[http://ontoframe.kr/Dummy/0001]" and "-[http://ontoframe.kr/Dummy/0001]-field-[http://ontoframe/kr/SportsEvent/0001]".

RDF Triple Creating Module According to Second Embodiment

As shown in FIG. 4, an RDF triple creating module 150 according to the second embodiment may include a mining pattern comparing unit 156, a class-based RDF triple creating unit 157, a term-based RDF triple creating unit 158, and an identifier-based RDF triple creating unit 159.

The mining pattern comparing unit 156 can search a the same mining patterns by comparing mining patterns stored in the mining rule managing module 130 and mining patterns of a text document, in link with the mining rule managing module 130.

The class-based RDF triple creating unit 157 can determine an RDF triple composed of classes and properties corresponding to the corresponding mining pattern of the mining rule managing module 140 on the basis of the result comparing mining patterns of the mining pattern comparing unit 156.

The mining rule managing unit 140 can store one mining pattern and one or more RDF triples corresponding to the mining pattern in one format, in accordance with a property (key value).

Therefore, when the mining pattern comparing unit 156 finds out a corresponding mining pattern of a text and a corresponding mining pattern of the mining rule managing module 140, it is possible to determine a corresponding RDF triple.

The mining pattern stored in the mining rule managing module 130 and the mining pattern of the text document which will be compared can be determined by user's selection or determined by a predetermined key value (relationship value) or the entire key values (properties).

The term-based RDF triple creating unit 158 can create a term-based RDF triple composed of terms and properties by converting the classes of an RDF triple composed of classes and properties into corresponding terms, in link with the class managing module 120.

The identifier-base RDF triple creating unit 159 searches the class managing module 120, and can create an RDF triple by converting the terms of the term-based RDF triple into identifiers of the representative terms of the authority data, when there is a term having different terms and the same identifier.

The class-based RDF triple creating unit 157 and the term-based RDF triple creating unit 158 of the second embodiment correspond to the first RDF triple creating unit 152 and the second RDF triple creating unit 152 of the first embodiment, respectively, and the functions are the same.

However, the identifier-based RDF triple creating unit 159 of the second embodiment integrates the functions of the third RDF triple creating unit 154 and the fourth RDF triple creating unit 155 of the first embodiment, and the second embodiment is different in that an RDF triple is created by using the identifiers of the representative terms, when a plurality of terms are stored for the same object in the class managing module 120.

<Resource Description Framework Network Construction Method using Ontology Schema>

Figure 5:
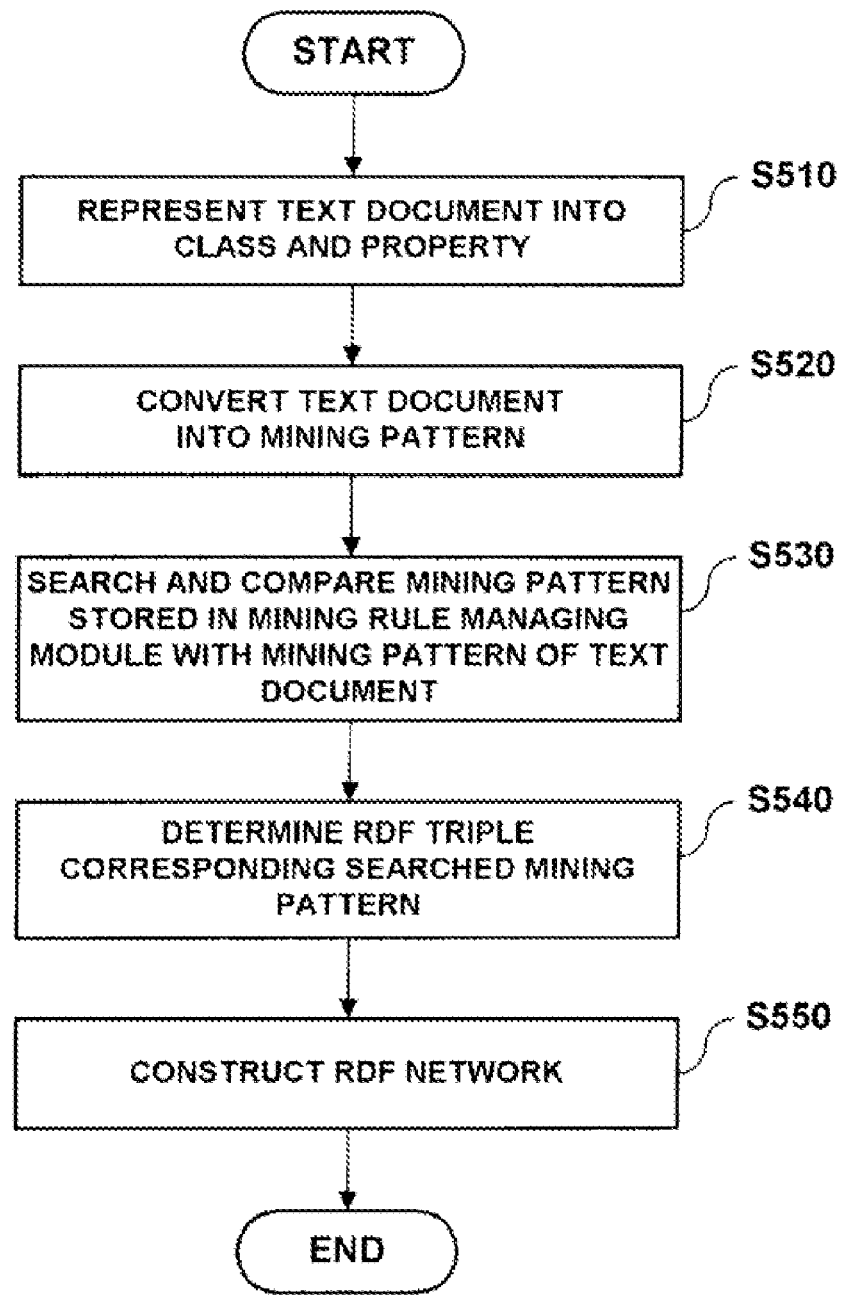
FIG. 5 is a flowchart illustrating an embodiment of a resource description framework network construction method using an ontology schema according to another aspect of the present invention.

FIG. 5 is a flowchart illustrating an embodiment of a resource description framework network construction method using an ontology schema according to another aspect of the present invention.

According to an embodiment of the present invention, as shown in FIG. 5, a text document is represented by classes and properties (S510), the text document is converted into a mining pattern (S520), the mining pattern stored in the mining rule managing module and the mining pattern of the text document are searched and compared (S530), an RDF triple corresponding to the searched mining pattern is determined (S540), and an RDF network is constructed (S550).

The RDF network construction method using an ontology schema of the present invention constructs a RDF network from an input text document by using an ontology schema storing module combined with a class managing module and a mining rule managing module, in a system including the ontology schema storing module, the class managing module, and the mining rule managing module.

Each process of the RDF network construction method using an ontology schema is described in detail.

Method of Representing Text Document with Class and Property

Figure 6:
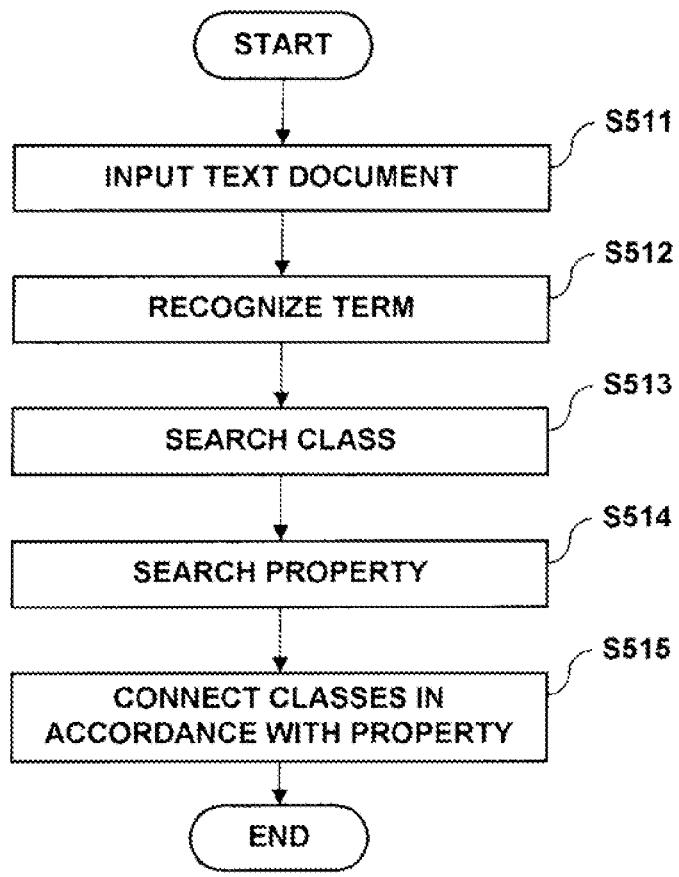
FIG. 6 is a flowchart illustrating an embodiment of a process of expressing a text document of the resource description framework network construction method using an ontology schema according to another aspect of the present invention into a class and a property.

FIG. 6 is a flowchart illustrating an embodiment of a process of expressing a text document of the resource description framework network construction method using an ontology schema according to another aspect of the present invention into a class and a property.

First, as shown in FIG. 6, a process of representing a text document with classes and properties (S510) may include receiving a text document (S511), recognizing terms from the input text document (S512), searching classes corresponding to the recognized terms by using the class managing module (S513), searching the property of an ontology schema by using concepts corresponding to the classes (S514), and representing the relationship between the classes with the searched properties.

Figure 7:
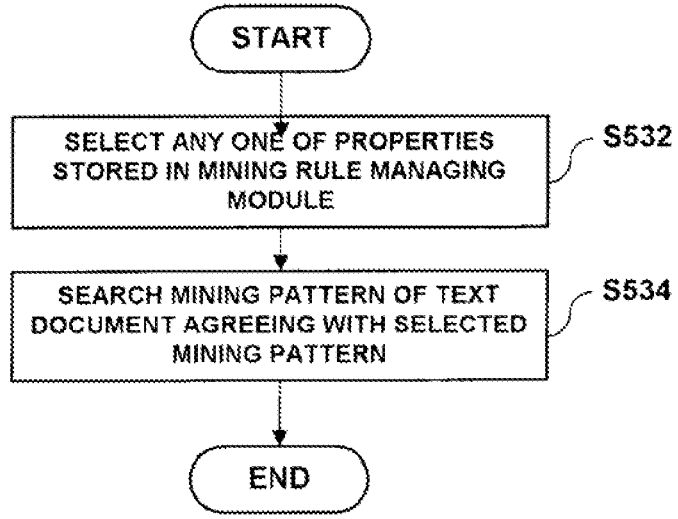
FIG. 7 is a flowchart illustrating an embodiment of a process of searching comparing mining patterns of a text document with mining patterns stored in a mining rule managing module of the resource description framework network construction method using an ontology schema according to another aspect of the present invention.
Figure 8:
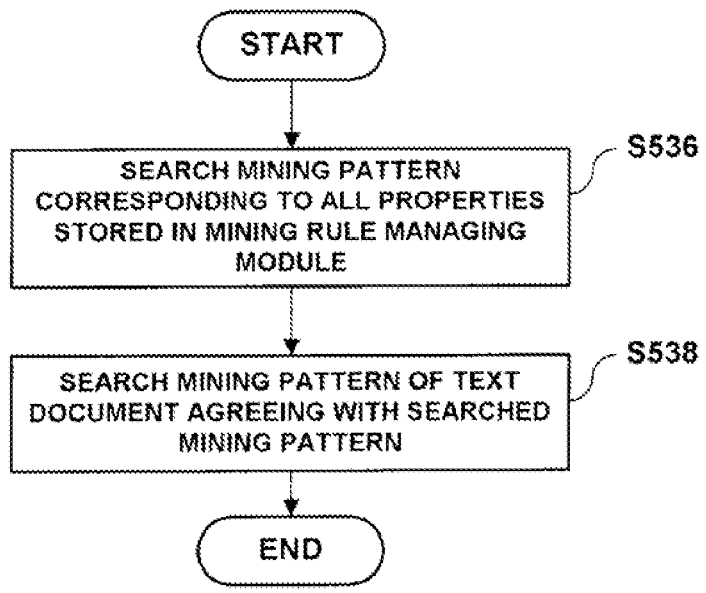
FIG. 8 is a flowchart illustrating another embodiment of a process searching and comparing mining patterns of a text document with mining patterns stored in a mining rule managing module of the resource description framework network construction method using an ontology schema according to another aspect of the present invention.

FIG. 7 is a flowchart illustrating an embodiment of a process of searching comparing mining patterns of a text document with mining patterns stored in a mining rule managing module of the resource description framework network construction method using an ontology schema according to another aspect of the present invention and FIG. 8 is a flowchart illustrating another embodiment of a process searching and comparing mining patterns of a text document with mining patterns stored in a mining rule managing module of the resource description framework network construction method using an ontology schema according to another aspect of the present invention.

Method of Searching and Comparing Mining Pattern According to First Embodiment

The first embodiment searching and comparing the mining patterns stored in the mining rule managing module and the mining patterns of a text document (S530), as shown in FIG. 7, may include selecting any one of the properties stored in the mining rule managing module (S532) and searching a mining pattern of the text document which agrees with the mining pattern corresponding to the selected property (S534).

Method of Searching and Comparing Mining Pattern According to Second Embodiment

The second embodiment searching and comparing the mining pattern stored in the mining rule managing module and the mining pattern of a text document (S530), as shown in FIG. 7, may include sequentially searching mining patterns corresponding to all properties stored in the mining rule managing module (S536) and searching a mining pattern the same mining patterns by comparing the sequentially searched mining patterns with the mining patterns of the text document.

Figure 9:
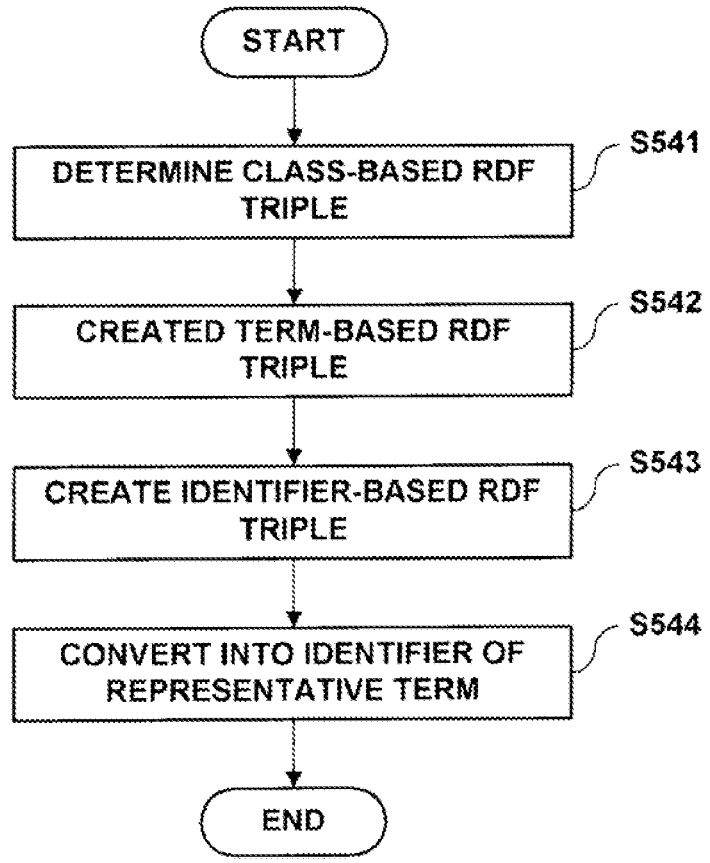
FIG. 9 is a flowchart illustrating an embodiment of determining an RDF triple corresponding to a mining pattern searched in the resource description framework network construction method using an ontology schema according to another aspect of the present invention.
Figure 10:
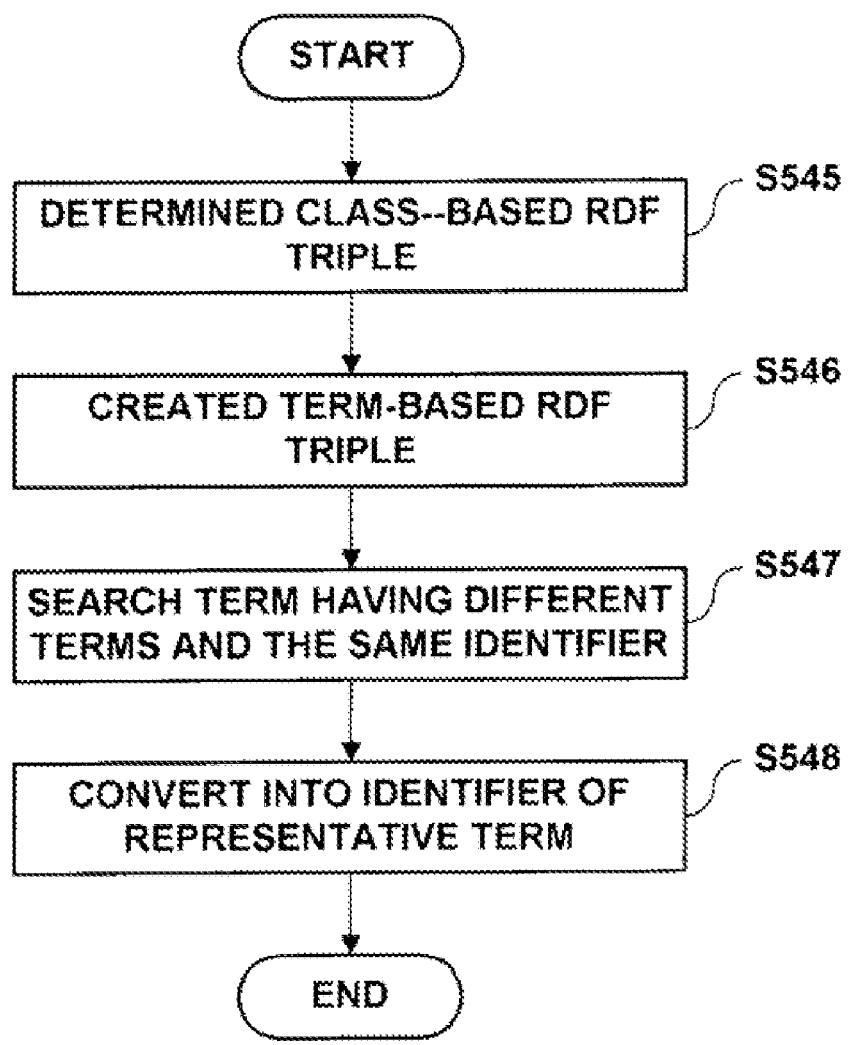
FIG. 10 is a flowchart illustrating another embodiment of determining an RDF triple corresponding to a mining pattern searched in the resource description framework network construction method using an ontology schema according to another aspect of the present invention.

FIG. 9 is a flowchart illustrating an embodiment of determining an RDF triple corresponding to a mining pattern searched in the resource description framework network construction method using an ontology schema according to another aspect of the present invention and FIG. 10 is a flowchart illustrating another embodiment of determining an RDF triple corresponding to a mining pattern searched in the resource description framework network construction method using an ontology schema according to another aspect of the present invention.

The determining of an RDF triple corresponding to the searched mining pattern (S540) may be implemented through the third or fourth process.

Method of determining RDF Triple According to First Embodiment

The first embodiment determining an RDF triple corresponding to the searched mining patterns, as shown in FIG. 9, may include determining a class-based RDF triple (S541), creating a term-based RDF triple (S542), creating an identifier-based RDF (S543), and converting identifiers into identifiers of representative terms (S544).

The first step, the determining of a class-based RDF triple (S541) can determine a class-based RDF triple composed of "[class]-property-[class]" by searching classes and properties which correspond to the same mining patterns of the mining pattern managing module, on the basis of the result of comparing mining patterns.

The second step, the creating of a term-based RDF triple (S542) can create a term-based RDF triple composed of "[term]-property-[term]" by converting the classes of the class-based RDF triple into terms, in link with the class managing module.

The third step, the creating of an identifier-based RDF triple (S543) can create an identifier-based RDF triple composed of "[identifier of term]-property-[identifier of term]" by converting the terms of the term-based RDF triple into identifiers of the terms, in link with the class managing module.

When the there is a term having different terms and the same identifier as a result of searching the class managing module, the fourth step may be further included.

The fourth step, the converting identifier into identifiers of representative terms (544) can create an RDF triple composed of "[identifier of representative term]-property-[identifier of representative term]" by converting identifier of the identifier-based RDF triple into identifiers of representative terms of the authority data.

Method of Determining RDF Triple According to Second Embodiment

The second embodiment determining an RDF triple corresponding to the searched mining patterns, as shown in FIG. 10, may include determining a class-based RDF triple (S545), creating a term-based RDF triple (S546), searching a term having different terms and the same identifier (S547), and converting the identifier into identifier of a representative term (S548).

The second embodiment determining an RDF triple corresponding to the searched mining pattern is the same in the determining of a class-based RDF triple (S545) and the creating of a term-based RDF triple (S546) as the first embodiment, but is different in converting the term-based RDF triple into an identifier of representative term-based RDF triple.

The determining of an RDF triple according to the first embodiment is composed two conversion process of converting a term-based RDF triple represented by "[term]-property-[term]" into an identifier RDF triple represented by "[identifier of term]-[property]-[identifier of term]", and then converting the identifier-based RDF into a representative identifier-based RDF triple represented by "[identifier of representative term]-property-[identifier of representative term]".

On the contrary, the determining of an RDF triple according to the second embodiment is different from the first embodiment in that it is composed of a first conversion process, that is, it converts terms of a term-based RDF triple into identifiers of representative terms and directly converts a term-based RDF triple represented by "[term]-property-[term]" into a representative identifier-based RDF triple represented by "[identifier of representative terminal]-property-[identifier of representative term]".

<Record Medium Readable by Electronic Device and Recorded with Program Performing RDF Network Construction Method using Ontology Schema>

According to another aspect of the present invention, a record medium readable by electronic device and recorded with a program performing an RDF network construction method using an ontology schema is provided.

The RDF network construction method using an ontology schema can be implemented by a computer program, and the codes and the code segments of the program can be easily inferred by computer programmer in the art.

Further, the RDF network construction method using an ontology schema is recorded in a computer readable medium and read and executed by a computer, thereby visually displaying services relating to objects corresponding to selected service properties.

According to the present invention it is possible to integrally mine and manage language sources, using an ontology schema connected with a class managing module and a mining rule managing module.

Further, it is possible to efficiently manage language sources by creating an RDF triple based on the same identifying system, when the same classes are represented by different terms.

The present invention can be applied to a device creating an RDF triple or constructing an RDF network, in link with an ontology schema storing module, a class managing module, and a mining rule managing module.

What is claimed is:

1. An RDF (Resource Description Framework) network construction device using an ontology schema, comprising:
    a computer processor;
    an ontology schema storing module, executed by the computer processor, that stores an ontology schema defining a relationship system between concepts in a domain;
    a class managing module, executed by the computer processor, that connects and stores, in a set, authority data composed of classes, terms classified by the classes, identifiers of the terms, representative terms, and identifier of the representative terms, wherein the representative terms comprises terms that represent characteristic of the concepts;
    a mining rule managing module, executed by the computer processor, that connects and stores, in a set, properties of the ontology schema, one or more mining patterns corresponding to the properties, and one or more RDF triples corresponding to the one or more mining patterns, wherein each RDF triple comprises of a subject, an object, and a relationship between the subject and the object;
    a mining pattern creating module, executed by the computer processor, that is linked with the class managing module, recognizes terms from an input text document and represents the recognized terms into corresponding classes and properties representing relationships between the represented classes, and converts the text document, which represents the classes into properties, and into a mining pattern; and
    an RDF triple creating module, executed by the computer processor, that is linked with the mining rule managing module and creates an RDF triple by comparing the one or more mining patterns stored in the mining rule managing module with the mining pattern of the text document,
    wherein the classes of the class managing module are set by a key value and properties of the mining rule managing module are set by another key value, and
    wherein the RDF tripe creating module includes:
    a mining pattern comparing unit that compares the one of more mining patterns stored in the mining rule managing module with the mining pattern of the text document, in link with the mining rule managing module;
    a first RDF triple creating unit that determines a class-based RDF triple composed of at least one class and at least one property that correspond to the corresponding mining pattern of the mining pattern managing module, on the basis of a result of the compared patterns;
    a second RDF triple creating unit that creates a term-based RDF triple composed of properties and terms, by converting the at least one class of the class-based RDF triple into corresponding terms, in link with the class managing module; and
    a third RDF triple creating unit that converts the corresponding terms of the term-based RDF triple into corresponding identifiers, in link with the class managing module, and creates an identifier-base RDF triple composed of the identifiers and the properties.

2. The RDF network construction device according to claim 1, further comprising:
    an RDF network creating module that constructs an RDF network by searching classes having same identifiers from different RDF triples and connecting the classes with the same identifiers.

3. The RDF network construction device according to claim 1, wherein the mining pattern creating module includes:
    a class recognizing unit that recognizes the terms from the input text documents by using morphological analysis, syntax analysis, and semantic analysis on the input text document, in link with the class managing module, and represents the recognized terms into the represented classes corresponding to the recognized terms stored in the class managing module; and
    a mining pattern converting unit that converts the input text document including the represented classes into the mining pattern.

4. The RDF network construction device according to claim 1, wherein the RDF triple creating module further includes a fourth RDF triple creating unit that, when a multi-word term having different single-word terms and a same identifier is searched from the class managing module, creates a new RDF triple by converting the identifiers of the identifier-based RDF triple created by the third RDF triple creating unit into the identifiers of the representative term of the authority data.

5. The RDF network construction device according to claim 1, wherein the RDF triple creating module includes:
    a mining pattern comparing unit that compares the one or more mining patterns stored in the mining rule managing module with the mining pattern of the input text document, in link with the mining rule managing module;
    a class-based RDF triple creating unit that determines another RDF triple composed of classes and properties corresponding to the one or more mining patterns of the mining rule managing module on based on a result of the compared mining patterns;
    a term-based RDF triple creating unit that creates another term-based RDF triple composed of the terms and the properties of the other RDF triple by converting the classes of the other RDF triple into corresponding terms, in link with the class managing module; and
    an identifier-base RDF triple creating unit that, when there is another multi-word a term having different single-word terms and another same identifier, searches the class managing module and creates the other RDF triple by converting the terms of the term-based RDF triple into the identifiers of the representative terms of the authority data.

6. The RDF network construction device according to claim 1, the mining pattern of the input text document is configured in any one of formats of vocabulary, RE (regular expression), and LSP (Lexico-Semantic Pattern).

7. The RDF network construction device according to claim 1, wherein the RDF triple includes a single RDF triple composed of two classes and one property and a multi-RDF triple composed of two or more classes and two or more properties.

8. The RDF network construction device according to claim 7, wherein the multi-RDF triple is implemented by connecting two or more of the single RDF triples.

9. The RDF network construction device according to claim 1, the RDF triple creating module is linked with the mining rule managing module and creates the RDF triple by comparing mining patterns corresponding to all of the properties stored in the mining rule managing module with the mining pattern of the input text document.

10. The RDF network construction device according to claim 1, wherein the RDF triple creating module is linked with the mining rule managing module and connected with an user interface selecting any one of the properties stored in the mining rule managing module, or predetermined properties, and creates the RDF triple by comparing the mining pattern corresponding to a selected property with the mining pattern of the input text document.

11. An RDF (Resource Description Framework) network construction method using an ontology schema, comprising:

using an ontology schema storing module that stores the ontology schema defining a relationship system between concepts in a domain, using a class managing module that connects and stores, in a set, authority data composed of classes corresponding to the concepts of the ontology schema, terms classified by the classes, identifiers of the terms, representative terms, and identifier of the representative terms, wherein the representative terms comprises terms that represent corresponding characteristic of the concepts, using a mining rule managing module that connects and stores, in a set, properties of the ontology schema, one or more mining patterns corresponding to the properties, and one or more RDF triples corresponding to the mining patterns, wherein each RDF triple comprises of a subject, an object, and a relationship between the subject and the object, wherein the ontology schema storing module, the class managing module, and the mining rule managing module being linked with each other, and the method further comprising:

recognizing terms from an input text document and representing the recognized terms into the classes stored in the class managing module and the properties representing relationships of the classes;

converting the input text document represented by the classes and the properties into mining patterns;

searching same mining patterns by comparing the mining patterns stored in the mining rule managing module and the mining patterns of the text document, in link with the mining rule managing module; and determining an RDF triple corresponding to the searched mining patterns, and wherein the determining of an RDF triple corresponding to the searched mining patterns includes:

determining a class-based RDF triple composed of classes and properties corresponding to the same mining patterns of the mining pattern managing module, on the basis of the result of comparing mining patterns;

creating a term-based RDF triple composed of terms and properties by converting the classes of the class-based RDF triple into the corresponding terms, in link with the class managing module; and creating an identifier-based RDF tripe composed of identifiers and properties by converting the terms of the term-based RDF triple into the identifiers of the terms, in link with the class managing module.

12. The RDF network construction method according to claim 11, further comprising constructing an RDF network by searching for classes having same identifiers from different RDF triples and connected same classes.

13. The RDF network construction method according to claim 11, wherein the recognizing terms from the input text document and representing the terms into classes stored in the class managing module and properties representing relationships of the classes, includes:

recognizing the terms from the input text document;

searching classes corresponding to the recognized terms by using the class managing module;

searching properties of the ontology schema by using concepts corresponding to the classes of the class managing module; and representing relationships of the classes by using the searched properties.

14. The RDF network construction method according to claim 11, wherein the creating of an identifier-based RDF tripe further includes, when there is a term having different terms and a same identifier as a result of searching the class managing module, creating the RDF triple by converting the identifiers of the identifier-base RDF triple into the identifiers of the representative terms of the authority data.

15. The RDF network construction method according to claim 11, wherein the determining of an RDF triple corresponding to the searched mining patterns includes:

determining another class-based RDF triple composed of classes and properties corresponding to same mining patterns of the mining pattern managing module, based on a result of comparing mining patterns;

creating another term-based RDF triple composed of terms and properties by converting the classes of the other class-based RDF triple into the corresponding terms, in link with the class managing module; and creating another identifier-based RDF triple composed of identifiers and properties by, when there is a multi-word term having different single-word terms and a same identifier as the result of searching the class managing module, converting the terms of the term-based RDF triple into the representative terms of the authority data, in link with the class managing module.

16. The RDF network construction method according to claim 11, wherein the RDF triple includes a single RDF triple composed of two classes and one property and a multi-RDF triple composed of two or more classes and two or more properties.

17. The RDF network construction method according to claim 16, wherein the multi-RDF triple is implemented by connecting two or more of the single RDF triples.

18. The RDF network construction method according to claim 11, wherein the searching of the same mining patterns by comparing the one or more mining patterns stored in the mining rule managing module and the mining patterns of the input text document, in link with the mining rule managing module, includes:

selecting any one of the properties stored in the mining rule managing module; and determining that the mining pattern of the input text document matches with the one or more mining patterns of the selected property.

19. The RDF network construction method according to claim 11, wherein the searching of the same mining patterns by comparing the one or more mining patterns stored in the mining rule managing module and the mining patterns of the input text document, in link with the mining rule managing module, includes:

sequentially searching mining patterns relating to all of the properties stored in the mining rule managing module; and searching the same mining patterns by comparing the sequentially searched mining patterns with the mining patterns of the input text document.

* * * * *